(12) United States Patent
Alfano et al.

(10) Patent No.: US 12,031,917 B2
(45) Date of Patent: Jul. 9, 2024

(54) RAMAN SCATTERING FROM ORBITAL AND SPIN ANGULAR MOMENTUM IN MATERIALS

(71) Applicant: Robert R. Alfano, Bronx, NY (US)

(72) Inventors: Robert R. Alfano, Bronx, NY (US); Sandra Mamani Reyes, White Plains, NY (US)

(73) Assignee: Robert R. Alfano, Bronx, NY (US)

( * ) Notice: Subject to any disclaimer, the term of this patent is extended or adjusted under 35 U.S.C. 154(b) by 0 days.

(21) Appl. No.: 18/458,988

(22) Filed: Aug. 30, 2023

(65) Prior Publication Data
US 2024/0133814 A1     Apr. 25, 2024

Related U.S. Application Data

(60) Provisional application No. 63/402,327, filed on Aug. 30, 2022.

(51) Int. Cl.
*G01J 3/44*     (2006.01)
*G01N 21/65*    (2006.01)

(52) U.S. Cl.
CPC ... *G01N 21/65* (2013.01); *G01N 2201/06113* (2013.01); *G01N 2201/0633* (2013.01)

(58) Field of Classification Search
CPC ............... G01N 21/65; G01N 21/21; G01N 2201/06113; G01N 2201/0633; G01J 3/44; A61B 5/0075
See application file for complete search history.

(56) References Cited

U.S. PATENT DOCUMENTS

2017/0138851 A1* 5/2017 Ashrafi ............... G01N 33/487
2017/0153435 A1* 6/2017 Alfano ................ G06N 10/00
(Continued)

OTHER PUBLICATIONS

L. Allen, M.W Beijersbergen, R.J.C. Spreeuw, J.P. Woerdman, Orbital angular momentum of light and the transformation of Laguerre-Gaussian laser modes, Phys. Rev. A 45 (1992) 8185-89.
(Continued)

*Primary Examiner* — Abdullahi Nur
(74) *Attorney, Agent, or Firm* — Nolte Lackenbach Siegel

(57) ABSTRACT

A method for obtaining a polarized orbital angular momentum Raman spectrum using vector vortex beams, includes the steps of emitting a polarized laser light from a laser source. The polarized laser light is passed through a narrow band filter that is then passed through a section of wave plates (quarter or half wave plate) to generate polarized light (linear, circular, radial and azimuthal), then through a q-plate (vortex retarder or spiral plate) to give a vortex structure topology carrying orbital angular momentum with a helical phase. The polarized vector vortex light is then directed to contact a sample, thereby producing a Raman scatter beam. The Raman scatter beam is passed back and collected into a spectrometer, thereby obtaining a Raman scattering spectrum of the sample to investigate the matching of the multipoles of the material and the multipoles of the light. A method for transmission with Multiple expansions of orbital angular momentum in rat cerebellum tissue is also disclosed. In general, we use polarized Laguerre-Gaussian vector vortex beams as a topology multipole model to describe and study the light matter interaction for Raman and transmission using the fact that the optical vortices and material can possess Multipoles denoted as L in form of monopole (L=0), dipole (L=1), quadrupole (L=2), octupole (L=3), hexidecapole (L=4) and higher orders. These multipoles can be
(Continued)

involved with the matching up with the symmetry of the moments involved with vibrational states in Raman processes.

6 Claims, 9 Drawing Sheets

(56) References Cited

U.S. PATENT DOCUMENTS

2017/0253630 A1* 9/2017 Omatsu .................. C07K 1/306
2018/0201027 A1* 7/2018 Suzuki .................... B41J 2/442
2020/0298440 A1* 9/2020 Aoto ....................... B41J 2/442

OTHER PUBLICATIONS

S. Mamani, D. A. Nolan, L. Shi, R. R. Alfano, Special classes of optical vector vortex beams are Majorana-like photons, Opt. Comm. 464 (2020) 125425.
J. Li, J.J. Tu, J.L. Birman, Raman scattering using vortex light. J. Physc. Chem. Solids 77 (2015) 117-121.
J.D. Jackson JD. Classical Electrodynamics, John Wiley & Sons, NJ, USA, 1999, pp. 539-557 (chapter 16).

* cited by examiner

RAMAN SCATTERING FROM ORBITAL AND SPIN ANGULAR MOMENTUM IN MATERIALS

This application claims priority to U.S. Provisional Patent Application No. 63/402,327 filed Aug. 30, 2022, the contents of which are incorporated herein by reference.

BACKGROUND OF THE INVENTION

Field of the Invention

The invention generally relates to the field of Raman Scattering and, more specifically, to Raman scattering from orbital and spin angular momentum in materials.

Description of the Prior Art

The application of light's handedness (SAM) and light's phase structure (OAM) is very crucial and important, which stands out compared to a regular plane wave [1]. Its application could be used as a new way to understand the structure of various types of media such as solids, and liquids. Currently, there is a surge in optics research with these structured complex vortex light beams, which are known as optical vortices (scalar and vector beams) that can carry both OAM and SAM with a homogeneous or inhomogeneous state of polarization. In the case of the inhomogeneous beams, these beams can carry SAM and OAM-referred to as complex vector vortex beams, a special group called Majorana photons, which the main feature is their non-separability property in SAM and OAM [2]. In particular, with the circular polarization or circularly polarized OAM beams, a previous study has shown that SAM plays an important role in the improvement in the image contrast and light scattering effects in terms of transmissivity and spatial behavior. These OAM beams can possess multi-moments of a field to interact with matter such as the brain where it has been shown that for higher OAM values for circular OAM beams, there is more transmittance, resulting in a better penetrating ability and less scattering. OAM has also been used to trap particles inside the dark center of its vortex and spin due to absorption of the angular momentum. OAM has also been used to show Chiroptical interactions of light and chiral and non-chiral matter, as light can have dual chirality in its polarization and wavefront.

SUMMARY OF THE INVENTION

This disclosure studies the important effect that circularly polarized OAM has on Raman scattering for different materials samples (liquids, solids, etc). The study of Raman scattering dates back to 1928 with the first observations done by Sir Raman. Various Raman methods have been used in condensed and gaseous materials. There are several Raman methods: Spontaneous Raman, Resonance Raman, Surface Enhanced Raman, Stimulated Raman, and Coherent Anti-Stokes Raman Scattering to name a few common ones. A significant amount of research has focused on-the study of Raman effects using SAM to investigate the optical activity, chirality, and circular dichroism from chiral matter. The very first observations in 1973 showed a difference between the Raman spectra between right-handed polarization and left-handed polarization of around $10^{-3}$ fold change. However, little research has been focused on the use of OAM in Raman spectroscopy techniques [3]. Raman scattering is a salient process, which uses a methodological approach to reveal the electronic and vibrational structure of materials (chiral and non-chiral). The application of OAM in the Raman effect is crucial because a coupling can happen between the multipole moment of the OAM light wave's topology and the electronic and vibrational moment of the material's structure. This multipole moment coupling can be exhibited in terms of an expansion [4].

This disclosure reports on the first experimental observation of large increases of Raman intensity in the spectra of certain vibrational bonds in organic liquids and a decrease of other bonds relative to Gaussian (L=0) beams. The changes in Raman spectra are caused by circularly polarized OAM vortex light in liquids from vibrational multipole moments. The enhancement and decrease relevant from L=0 are attributed to matching up vibrations clouds symmetry with the orbital angular momentum of the light L coupled with the expansion of multi-moments of the vibration. The value L is related to the expansion of different multiple poles of the charge of the vibrational bonds and the symmetry where each term of the expansion is named as follows: the first term (zeroth-order) is a Monopole (L=0) moment; the second term (first-order) is a Dipole (L=1) moment; the third term (second-order) is a Quadrupole (L=2) moment; the fourth term (third-order) is an Octopole (L=3) moment; the fifth term (fourth-order) is a Hexadecapole (L=4) moment. This multipole expansion is given for the vibrations of the organic liquids arising from pi ($\pi$) and sigma ($\sigma$) bonds for CH3 and C—C being multipole-like.

We showed in general, the coupling between the topological structures of the multipole of the OAM light with the multipole of the material in Raman scattering. This coupling produces a better scattering for like-eigen vector vibrations and light-carrying OAM (L). This angular momentum Raman scattering method is larger in contrast with circular dichroism and Raman optical activity methods, which have changes on the order of $10^{-4}$.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

Figure 5:
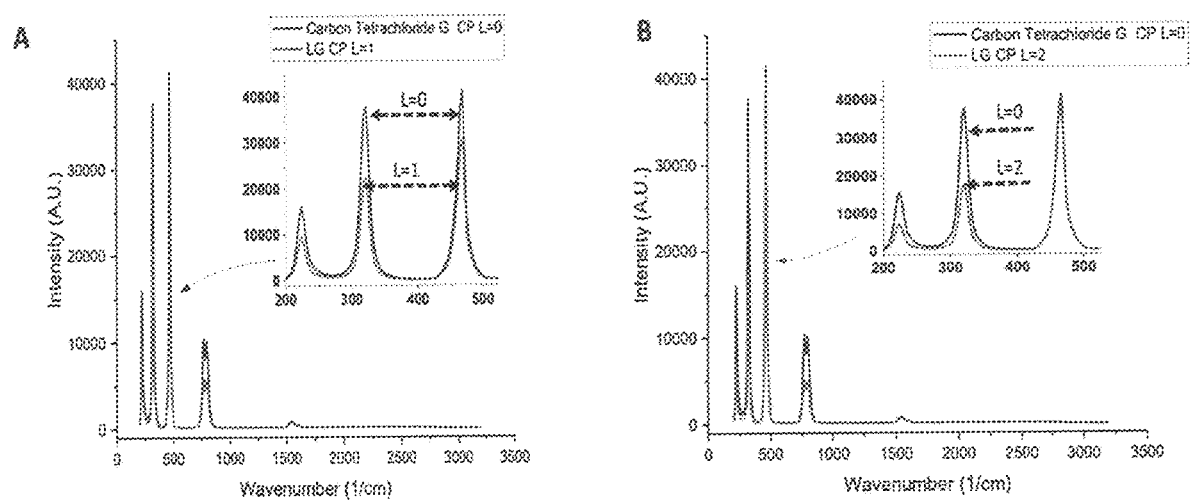
Figure 6:
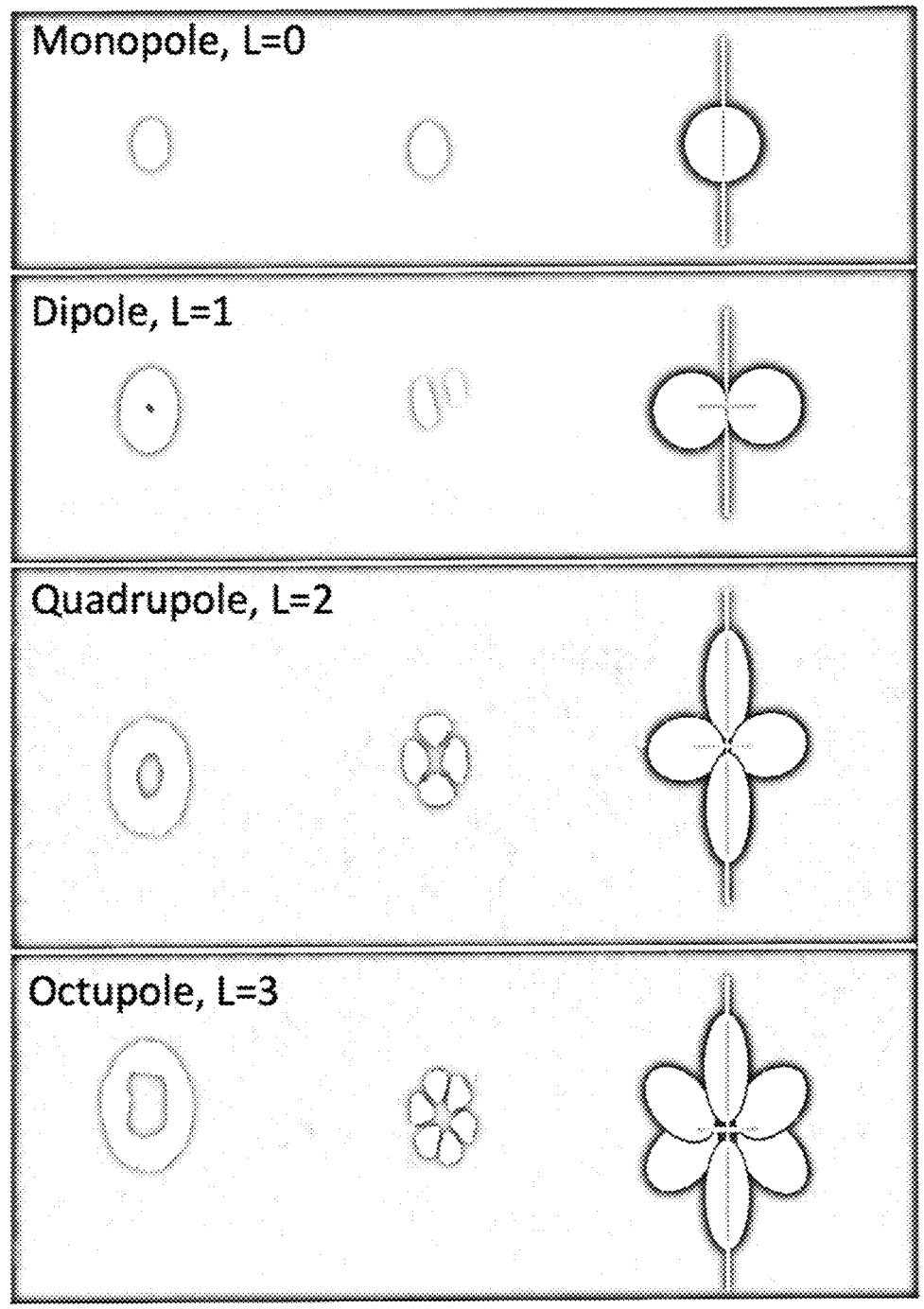
Figure 7:
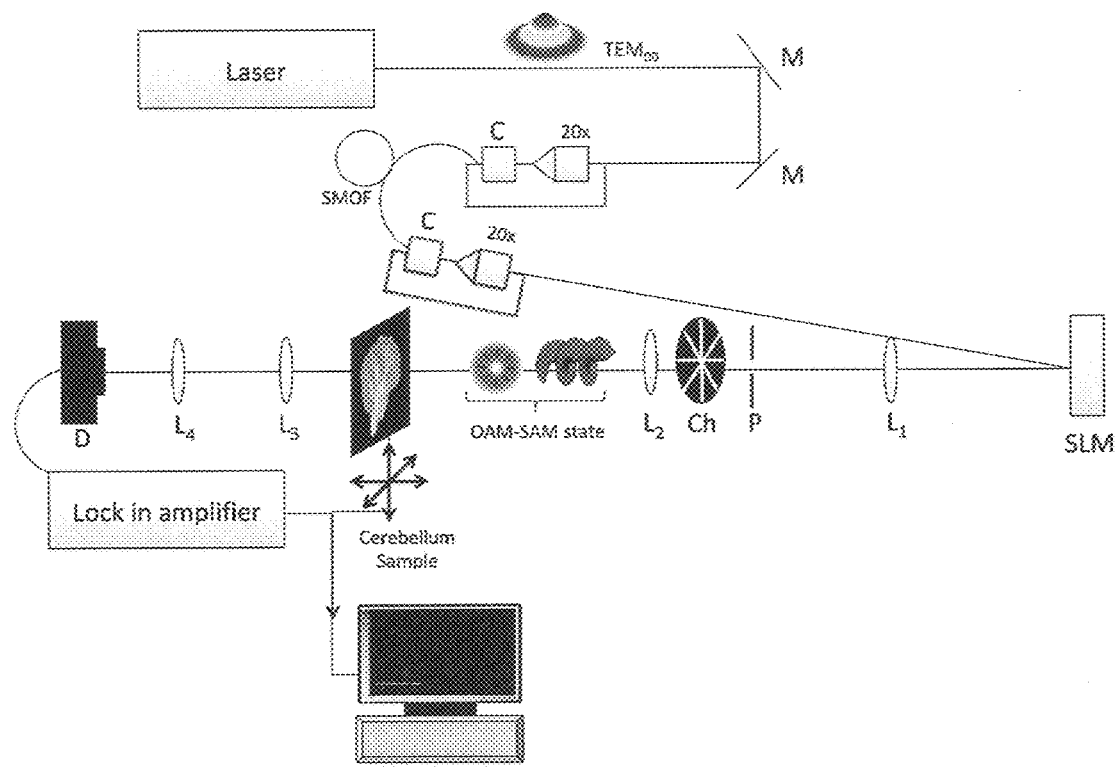
Figure 8:
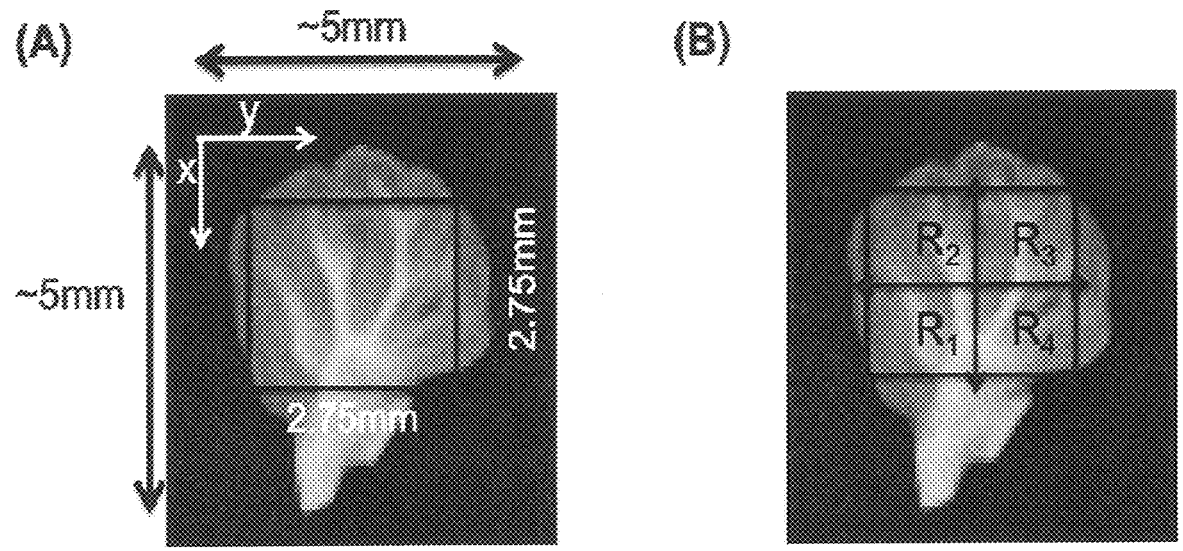
Figure 9:
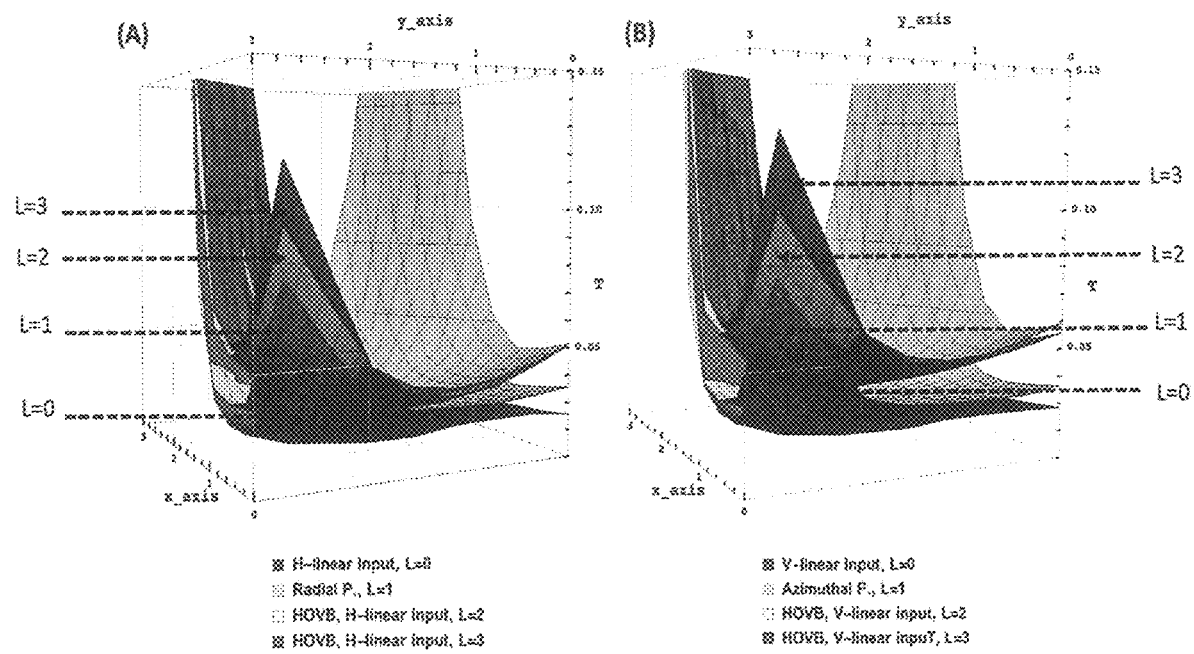
Figure 10:
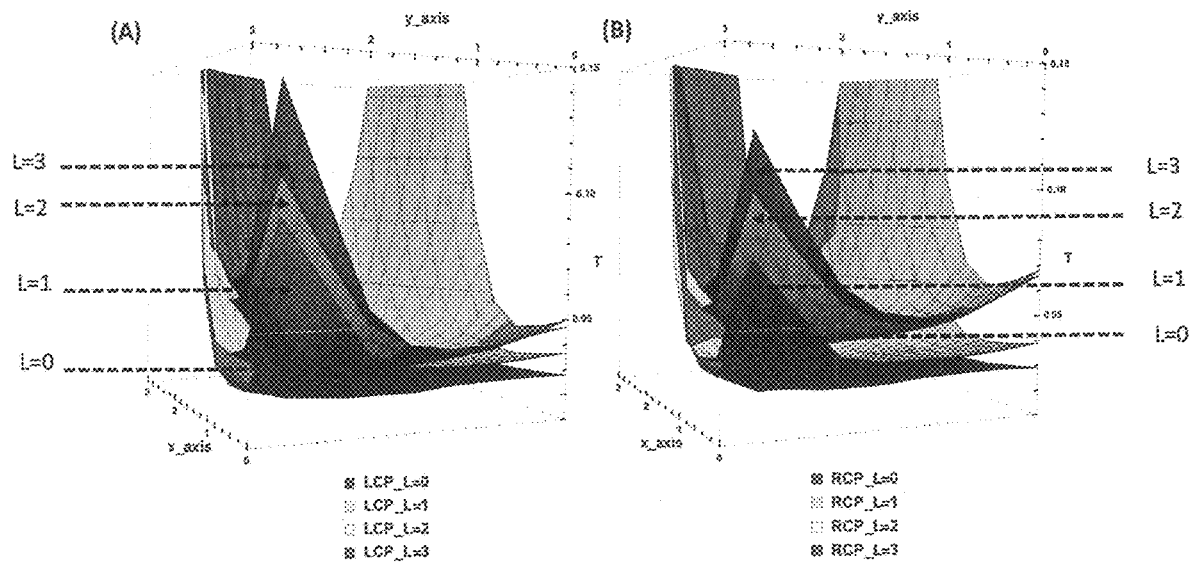
Figure 11:
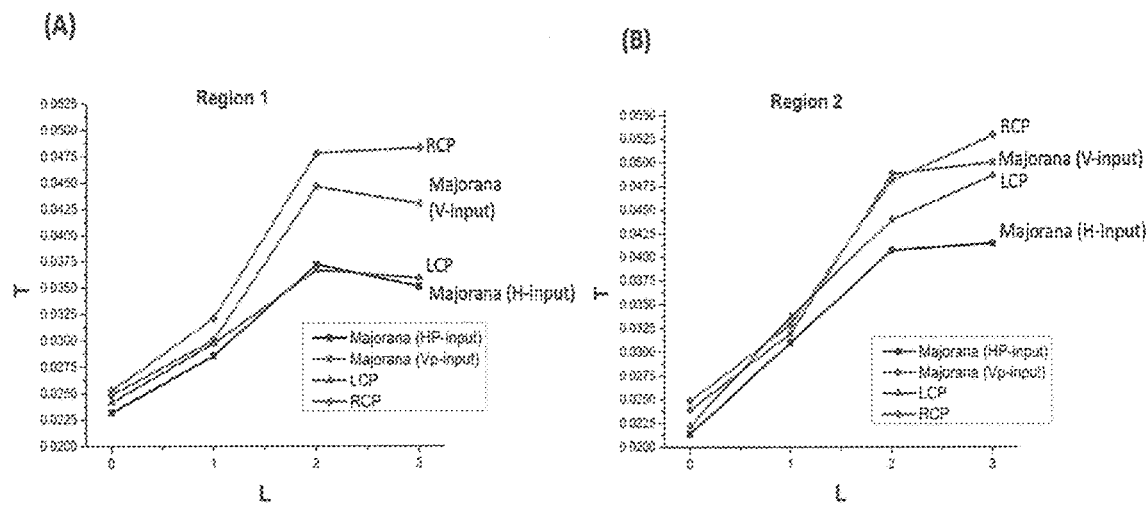
Figure 12:
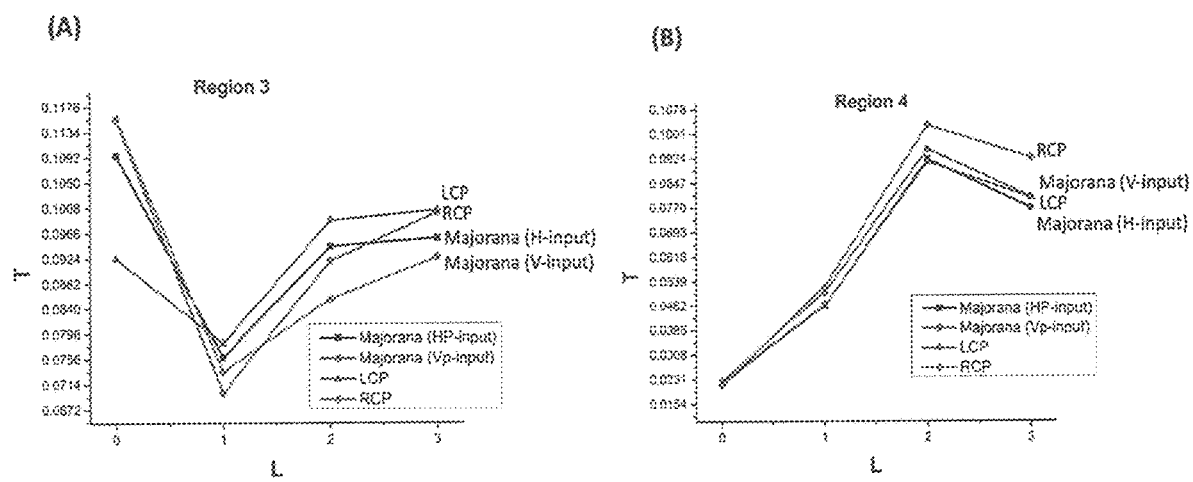

FIG. 5 illustrates a comparison of Raman spectra from Carbon Tetrachloride. (A) Gaussian Circularly Polarized (G CP) L=0 and Circularly Polarized Laguerre-Gaussian (LG CP) L=1 (B) G CP L=0 and LG CP L=2;

FIG. 6 illustrates degenerate electric multipole modes. It shows how Orbital Angular Momentum beams exhibit different multipole features. The first column shows the donut beam shapes for a value of L=0,1,2 and 3. The second column shows the interferograms of linearly polarized beams, which are obtained by sending the donut beams through a linear analyzer. Here, the lobes patterns form due to interference is characteristic of the OAM value. The third column shows the radiation patterns for pure multipoles in a spherical symmetry manner;

FIG. 7 shows experimental setup for transmission. M, mirror; C, collimator; SMOF, single-mode optical fiber; SLM (set to L=0), spatial light modulator; L, lenses; P, pinhole; Ch, chopper, D, detector. The OAM-SAM state was generated by the use of half-wave plates, quarter-wave plates, and vortex retarders;

FIG. 8 illustrates Cerebellum tissue samples. (A) Scanned region (B) Tissue sample divided into four different regions for analysis;

FIG. 9 illustrates transmission vs. sample position. Data plotted for transmission with Majorana LG beams when using different L values (L=0 to L=3) at different x and y positions in the sample measured in mm. (A) Majorana beams when sending a Horizontal beam as input polarization. (B) Majorana beam when sending a Vertical beam as input polarization;

FIG. 10 illustrates transmission vs. sample position. Data plotted for transmission with non-Majorana LG beams (Pure circular states of polarization) when using different L values (L=0 to L=3) at different x and y positions in the sample measured in mm. (A) Left circularly polarized beams. (B) Right circular polarized beams;

FIG. 11 illustrates T vs. OAM for Region 1 & 2. Data plotted for transmission T (arb. unit) versus OAM (L) values (L=0 to L=3) for four different polarization states at 2 different regions of the cerebellum control sample; and FIG. 12 illustrates T vs. OAM for Region 3 & 4. Data plotted for transmission T (arb. unit) versus OAM (L) values (L=0 to L=3) for four different polarization states at 2 different regions of the cerebellum control sample.

DETAILED DESCRIPTION

Raman Spectroscopy

Raman spectroscopy is an advanced technique used to determine intrinsic chemical and structural information of a sample. It provides a structural fingerprint, which can identify diseases, traces of chemicals, and metabolic changes in molecules. Raman spectroscopy technique is based on inelastic scattering also known as Raman Scattering (Eq. 1). When the incident light interacts with the molecules in the system, the energy of the incident photons is shifted up or down, which is interpreted as the loss or gain or energy or frequency shift. This shift of frequency provides information about the vibrational or rotational modes of the molecules. One Raman method is the Spontaneous Raman Scattering, which is approximately $10^{-6}$ of the incoming light intensity. This method is also used to describe vibrations or rotations distribution of molecules. The Raman scattering intensity can be described by using Eq. 1:

$$I_R = \int N\left(\frac{d\sigma}{d\Omega}\right)I_l d\Omega \quad (1)$$

where N is the number of molecules per unit volume, $d\sigma$ is the differential cross section per unit volume, $I_l$ is the intensity of the laser, and $d\Omega$ is the solid angle: During the Raman light-matter interaction, the light and the vibrational bonds of the molecules can have their multipole expansion structure in terms of spherical harmonics basis for angular momentum L and poles in the following form: Monopole (L=0); Dipole (L=1); Quadrupole (L=2); Octupole (L=3); and Hexadecapole (L=4) [4].

Raman light can be generated with different states of OAM (L) and with vibrations that can have different symmetries from its sigma ($\sigma$) and pi ($\pi$) bonding, stretch, and bending of CH and CC bonds. With this in mind, the light and vibration are coupled from convolution from symmetries and multipoles. Extending Eq. 1, the Raman intensity should depend on the coupling of the cross section and the light intensity from the convolution of symmetry of multipoles of light, OAM (L), and vibrational cloud as shown in Eq. 2:

$$I_R = \sum_{L \to L'} \int N\left(\frac{d\sigma}{d\Omega}\right)_{L'} \otimes I_{l,L} d\Omega \quad (2)$$

where L' and L are angular momentum of the vibration L' and OAM (L) light via multipole expansion, $I_{l,L}$ is the intensity of the laser beam with OAM (L). The maximum efficiency for the Raman process can occur when there is a matchup of the light's OAM (L) and L' of vibration from expansion in multipoles. For example, for LG OAM L=1 beam the Raman from dipole stretch of vibration with L'=1, there will be a large enhancement in scattering for the stretch vibration when compared to the Raman for Gaussian L=0 beams.

Structured light can possesses quantum features where the electric (E) and magnetic (B) fields have major differences when it comes to symmetry, and there's a need to have proper second quantization in terms of the creator ($\alpha^\dagger$) and annihilator ($\alpha$) Hermitian operators using OAM and quantizing E and B fields.

Raman Methods and Experimental Set-Up

Figure 1:
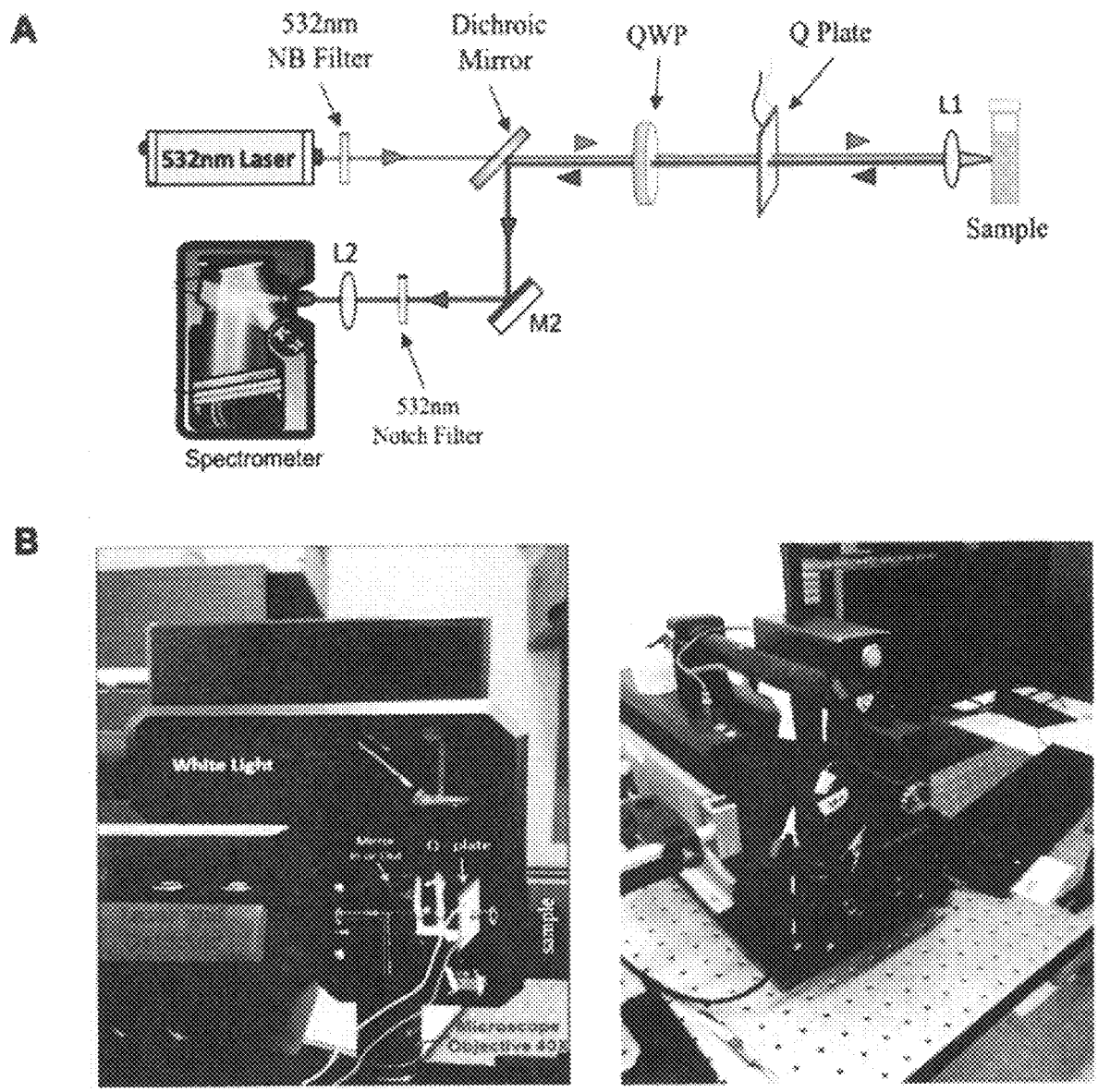
FIG. 1. (A) Schematic diagram of the Raman set-up with a q-plate to generate the OAM beams. NB, narrow band filter; QWP, quarter-wave plate; q-plate (q=½ or 1); L1 or L2, lens; M2, mirror. (B) Photo of the Raman microscope equipment (IDRaman Micro, Ocean Optics, Inc.). This instrument was modified by removing the side plate and inserting various optical plates (q-plate and quarter wave plate) to generate the different circular polarized OAM (L) beams as shown in the schematic.

The experimental set-up constitutes a 532 nm laser horizontally polarized beam, which travels at +45 degrees through a quarter-wave plate to generate a circularly polarized beam (shown in FIG. 1). This beam travels through a q-plate to generate a circularly polarized optical vortex. Then, the generated beam focuses on the sample. Then, the Raman scatter beam travels back through the plates and send into a spectrometer. The data was collected with an output power of 31.9 mW, with an integration time of 2 seconds, and a number of acquisitions of 5. For L=1, a q-plate of q=½ was used, and for L=2, a q=1 was used. L=0 is also referred to as Gaussian in this disclosure and was generated with no use of a q-plate. Different voltages were applied to each q-plate using a function generator (1.37V for q=½; 5.52V for q=1; 3.2V at 2 KHz). These generated beams were used to probe various samples such as Methanol and Carbon Tetrachloride.

Figure 2:
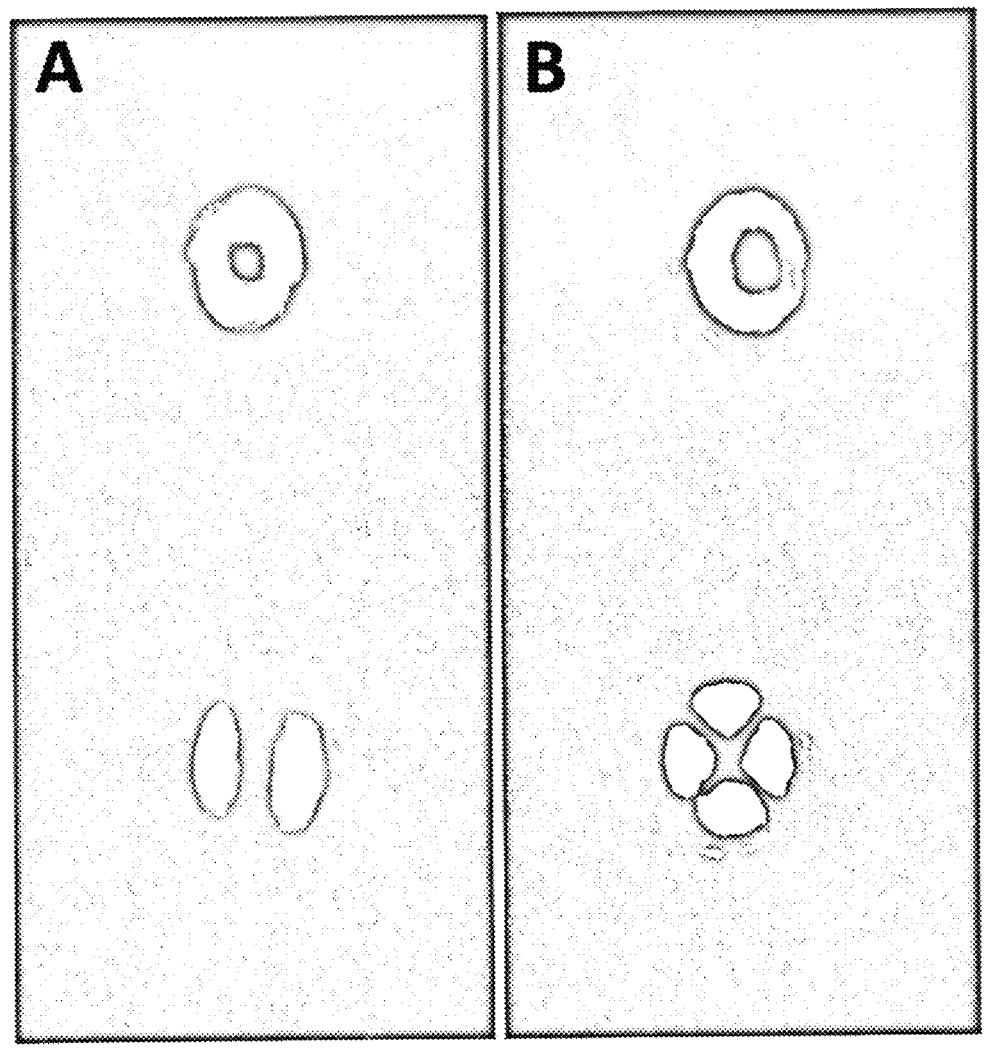
FIG. 2 illustrates experimentally recorded interferograms. Circularly polarized beams (top). Linearly polarized beams using linear analyzers (bottom), where the intensity beam profile characteristic of each value is shown. (A) L=1, where two lobes intensity pattern are shown at the bottom. (B) L=2, where four lobes intensity pattern are shown at the bottom.
Figure 3:
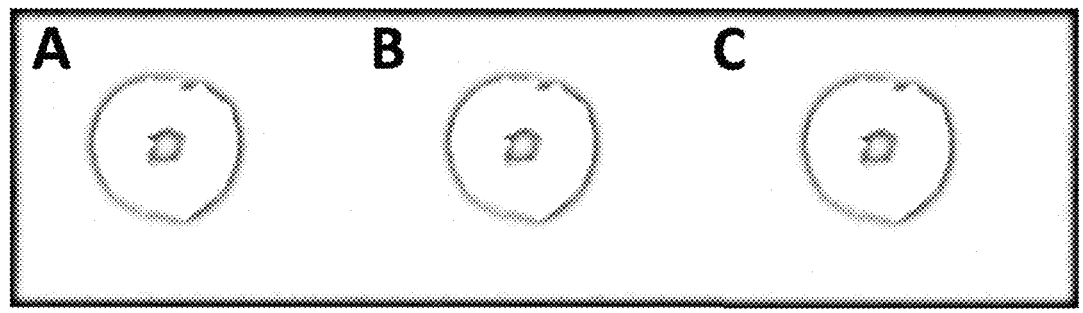
FIG. 3 illustrates circularly polarized OAM beam for L=1 (A) beam with no analyzer. (B) Beam with a horizontal analyzer. (C) Beam with a vertical analyzer. This is similarly applied to L=2.

To generate the OAM beam, we first align the horizontally polarized beam with respect to the q-plate. To verify the alignment and OAM value generated, we place a linear analyzer after the q-plate (See FIG. 2). There we observe a different beam break pattern for each L value generated.

After the q-plate alignment, we place the quarter wave plate into the set-up (before q-plate). Then, we place a linear polarized analyzer right after the q-plate. This time we observe no beam break and only a decrease of intensity. This is an indicator of a circular polarized OAM beam as shown below.

Raman Measurements and Results

This section shows the SAM-OAM Raman spectra from two main neat liquids tested.

Figure 4:
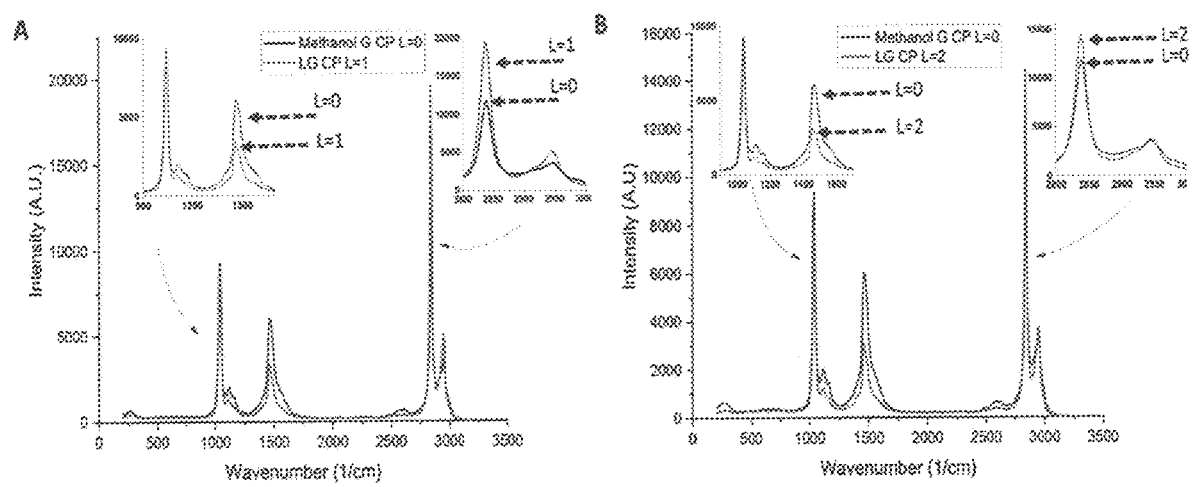
FIG. 4 illustrates comparison of Raman spectra from Methanol. (A) Gaussian Circularly Polarized (G CP) L=0 and Circularly Polarized Laguerre-Gaussian (LG CP) L=1 (B) G CP L=0 and LG CP L=2.

Methanol:

FIG. 4 shows Raman spectra from Methanol (ACS Spectrophotometric grade, ≥99.9%) using circularly polarized LG beams of L=0, 1, 2. The Raman spectra for L=1 and L=2 show an enhancement on the 2839 cm−1 and 2945 cm−1 Raman peaks and a decrease for the 1038 cm−1 and 1465 cm−1 in comparison with the Raman for L=0 beam. For L=1, these peaks at 2839 cm−1 and 2945 cm−1 had more substantial contribution in intensity corresponding to the C—H heightened activities of sigma bonds stretching and bending and to the C—O and O—H sigma bonds vibration of Methanol.

Table 1 shows the Intensity count difference in Raman modes from the various key vibrations (2839, 2946, 1465, and 1038 cm−1) from methanol for L=1 and 2 compared to L=0.

TABLE 1

Intensity comparison of Methanol lines for different circularly polarized (CP) L values.

| $\bar{v}$ (cm$^{-1}$) | Intensity (AU) CP L = 0 | Intensity (AU) CP L = 1 | Intensity (AU) CP L = 2 |
|---|---|---|---|
| 2839 | 11717 | 19542 (+66.8% from L = 0) | 14412 (+23% from L = 0) |
| 2946 | 3558 | 5096 (+43.2% from L = 0) | 3721 (+4.5% from L = 0) |
| 1465 | 6003 | 3364 (−44% from L = 0) | 3080 (−48.7% from L-0) |
| 1038 | 9343 | 9043 (−3.21% from L = 0) | 8133 (−13% from L = 0) |

Carbon Tetrachloride CCL4:

FIG. 5 shows the Raman spectra from Carbon Tetrachloride CCL4 using circularly polarized LG beams of L=0, 1, 2, in a 2 mm cylindrical glass cuvette. Both L=1 and L=2 had peaks 321 cm−1 and 467 cm−1, but these peaks were substantially lower than L=0 by 52.69% when compared to L=2 at 467 cm−1 wavenumber.

Table 2 shows the intensity count difference in Raman modes from two key vibrations (321 and 467 cm−1) from CCl4 for L=1 and 2 compared to L=0.

TABLE 2

Intensity comparison of CCL4 for different circularly polarized (CP) L values.

| $\bar{v}$ (cm$^{-1}$) | Intensity (AU) CP L = 0 | Intensity (AU) CP L = 1 | Intensity (AU) CP L = 2 |
|---|---|---|---|
| 321 | 37673 | 22271 (−40.8% from L = 0) | 17823 (−52.7% from L = 0) |
| 467 | 41342 | 30971 (−25.1% from L = 0) | 40012 (−3.21% from L = 0) |

DISCUSSION

Methanol contains two interior atoms of carbon and oxygen with overlapping orbitals and a single sigma bond. C and O orbitals are hybridized as sp 3 orbitals, and the H orbitals are spherical. Also, three hydrogen atoms on one side have shared orbitals with carbon (3 sigma bonds) and a tetrahedral molecular geometrical shape. On the other side, one hydrogen atom shares an orbital with oxygen (sigma bond) forming a bent molecular geometrical shape. In total, there are 5 sigma bonds in Methanol and no pi bonds. We also note that the bond length plays an important role in the vibration, for example, the H—C, H—O, and C—O bonds have lengths of 110, 97, and 143 (pm) respectively. Bonds are weaker as the length increases between atoms. Usually, the CH3 group is symmetrical, but when the O—H is attached to the CH3 the bonds are no longer equal. We end up with two anti-symmetrical stretching bands, one is in the plane of H—C—O—H and one is out of plane stretching.

Based on the data from Methanol, we observe a clear increase in intensity for the major Raman lines associated with Methanol, namely the 2839 cm−1 and 2946 cm−1 lines. Intensity at 2839 cm−1 went up by a drastic 66.78% from L=0 to L=1 indicating a dipole radiation pattern (Table 1). These modes are known to be mainly symmetric CH3 bending with some out-of-plane stretching to in-plane stretching as you move closer to 2900 cm-1. This is known as the C—H stretching region, which is where Fermi resonance occurs. At 2946 cm−1 we also see a substantial increase in the intensity of 43.22% (Table 1). This region is mainly known for both in-plane and out-of-plane anti-symmetric stretching. On the other hand, when we compared L=0 to L=2 in the 2839 cm−1 and 2946 cm−1 range, the increase in intensity was 23% and 4.58% respectively, which is less substantial than the L=1 results but still higher than L=0 (Table 1). Our experimental results strongly suggest that Methanol, under L=0, 1, and 2 inhibit a more dominant dipole (L=1) moment vibrational profile than quadrupole, and more quadrupole (L=2) than monopole (L=0).

Lastly, when we look at the results from CCL4, the Carbon Tetrachloride molecule shows a decrease in intensity for all modes including for 321 cm−1 and 467 cm−1, indicating no dipole or quadrupole moment behavior because of the symmetry of the molecule and its geometrical shape (Table 2). Instead, we can say it behaves like a monopole due to its symmetry and to the intensity for L=0 being the highest.

CONCLUSION

We observed that SAM-OAM could enhance and diminish certain bonds' Raman Peaks arising from couple symmetry between the moments of light L and vibration moments L. This newly proposed novel method uses OAM (L) for identifying and classifying organic liquids based on their response to SAM (polarization) and OAM (wavefront) structured light beam. Our method supported by the experiment, measures the intensity for a given wavenumber and compares the L values, then makes a correspondence. If the highest intensity is a result of circularly polarized L=0 beam, that means the molecule under investigation is acting like a monopole. If the highest intensity corresponds to L=1 circularly polarized OAM beam, then we assume it has a dipole molecule. If the highest intensity was from L=2 circularly polarized OAM then we have a Quadrupole and for higher moments Octopole (L=3), or Hexadecapole (L=4).

According to our results in the study of spontaneous Raman scattering using circularly polarized OAM beams (L=1, L=2), the increase in intensity corresponding to certain bonds of different liquids of Raman peaks molecules (Methanol, and CCL4) is attributed to the nature of the OAM light beam matching up the symmetry of the vibrational states of the molecules and their bonds. The result is justified by the expansion of multipole moments of charges relevant to the geometrical shape of the molecule resulting in a dipole, for L=1, quadrupole for L=2, and higher coupling with similar moments of the OAM light.

In conclusion, the Raman measurement using orbital angular momentum (OAM) and spin angular momentum (SAM) offers a new approach for larger changes in liquids and possibly in chiral solids and bio-media, in contrast with circular dichroism and Raman optical activity methods, which have changes of less than $10^{-4}$. This work can also be extended for different polarization singularities. Therefore, the angular momentum Raman method can be used to study other optical processes such as absorption and fluorescence from electronic and vibrational states.

OAM Transmission of Polarized Multipole Laser Beams in Rat Cerebellum Tissue

INTRODUCTION

This disclosure focuses on the polarized Laguerre-Gaussian beams (linear, circular, radial, and azimuthal polarization), which are investigated in a rat cerebellum tissue and shown to have higher penetration ability for higher values of OAM (L). In this work, we introduce for the first time a topology multipole model to describe the light matter interaction for transmission using the fact that the optical vortices and material can possess Multipoles denoted as L in form of monopole (L=0), dipole (L=1), quadrupole (L=2), octupole (L=3), hexidecapole (L=4) and higher orders [4]. The convolution between the poles of the light matching the poles of the material can determine the strength of interaction when the topography of the orthogonal functions of the light and molecular structure of OAM match. The area of this work in using polarized OAM beams should improve the interaction and propagation with a media.

Transmission of the cerebellum and its interaction with optical vortices is investigated and studied for four types of polarization-linear polarization (horizontally and vertically polarized), radial polarization, azimuthal polarization, and circular polarization (left-handed and right-handed). The understanding how light propagates in the cerebellum tissue is of great importance due to the fact that cerebellum plays a major role in functions such as balance, posture, mental attention, motor learning, and vision among other important functions. The cerebellum is a major structure of the hindbrain, which is one of the three major regions of our brain and is located at the lower back of brain. The cerebellum tissue studied in this experimental research is of 21% oxygen.

The proposed study shows preliminary result of light matter interaction between special photons and the cerebellum tissue. These special photons can posses spin angular momentum (SAM) and orbital angular momentum (OAM), which can be coupled. When studying the cerebellum, parameters such as the polarization and OAM (L) values were varied. Our goal is to observe and examine light-chiral matter interaction in the tissue sample. Another goal is to find if there is proportionality between the transmission rate (photon absorption rate) and the OAM (L) for a certain type of polarization. Results will show the importance of salient properties of a photon such as polarization and the wavefront topology. Additionally, this work adds up to new interpretations of the transmission of optical vortices with different types of polarization through turbid or scatter media such as the brain. New interpretations of a bio-media and the matching of the multipole moment distribution of the beam topology and the structure of the tissue are well presented. Final results could serve as a bio-marker to detect or differentiate an abnormal tissue from a healthy one.

Background Theory: OAM and Multipole Expansion of the Electric Field

Optical Vortices and OAM Multipoles of the Light's Electric Field

Optical vortices describe such beams that inherit a 'donut-like' topology. These vortices are of two types-polarization vortex and phase vortex. Polarization vortices are characterized by a polarization singularity such as radial and azimuthal polarization, which are also known as cylindrical vector vortex beams (CVVB). These have an inhomogeneous phase structure. Unlike linear and circular polarization, which are known as scalar beams and have spatially homogeneous polarization structure. In addition to the spin angular momentum (SAM), a photon also carries some orbital angular momentum (OAM). A light beam that carries OAM is categorized as phase vortex. OAM beams are generated when the light bends forming a helical wavefront. These are characterized by an azimuthal phase dependence of $\exp(i\ell\phi)$ where $\phi$ is the azimuthal coordinate in the beam's cross section, and $\pm\ell$ is an integer value, which indicates if the beam twists clockwise or counterclockwise (left-handed vortex if $+\ell$ and right-handed vortex if $-\ell$). Also, the l dictates how many intertwined helical phase fronts the beam has. The OAM value carried by a photon is represented by $L=\pm\ell\hbar$. Meanwhile, SAM is associated with the polarization such as with right and left circular polarization, where $\pm\hbar\sigma$ describes the SAM per photon. A $\pm\sigma$ indicates a left-handed and right-handed circularly polarized light respectively.

The electric field for OAM beams can be expanded as the sum ($\Sigma$) over the orbital angular momentum value in terms of multipoles in terms of L (see table 3 on Transmission Theory). One can select a pure form of multipole L to interact with material's multipole L' for it's absorption and Raman cross sections ($\partial$).

One type of vortex beam that carries OAM is a Laguerre-Gaussian beam (LG) represented by Eq. 3. LG modes have a rotational symmetry along their propagation axis. They have a radial mode $\rho$ and an azimuthal mode $\ell$. The radial mode defines the outer annual rings. The azimuthal mode defines how many full cycles of $2\pi$ the phase is changing around the axis. These beams are also referred to as 'donut' beams and have zero intensity at the center, (resulting from destructive interference) and an annual intensity cross-section (Eq. 3).

$$\psi_{LG}\ell = \tag{3}$$

$$E_{LG}\ell(r, \phi, z) = E_o \frac{w_o}{w(z)} \left[\frac{\sqrt{2}r}{w(z)}\right]^{|\ell|} L_p^{|\ell|}\left(\frac{2r^2}{w^2(z)}\right) e^{-r^2/w^2(z)} e^{-ikr^2/2R(z)} e^{i\ell\phi} e^{i\varphi(z)}.$$

Equation 3 represents a Laguerre-Gaussian mode, which is a solution to the paraxial Helmholtz wave equation in cylindrical coordinates, where: r, ϕ, z are the radial, azimuthal, and longitudinal components, $E_o$ is the electric field amplitude; $w_o$ is the beam waist; $w(z)$ is the beam width ($w_o(1+z/z_R)^{1/2}$) in terms of the Rayleigh range ($z_R$); $L_p{}^{|\ell|}$ is the Laguerre polynomials in terms of its radial and azimuth index; $R(z)$ is the phase front radius; $\varphi(z)$ is the Guoy phase ($2p+|\ell|+1)\tan^{-1}(z/z_R)$.

The size of the OAM vortex's radius (donut shape) is defined by Equation 4. This equation represents the case of maximum intensity for a single ring donut shape given that $\ell \neq 0$ and $p=0$ while for a Gaussian wavefront $\ell = 0$.

$$r_\ell(z) = \sqrt{\frac{|\ell|}{2}} w(z). \tag{4}$$

The electric field E(t) can be expanded in multipole terms of special functions for L moments as per Jackson shown in Classical Electrodynamics in terms of Legendre, Laguerre Gaussian, Hermite-Gaussian, and Bessel functions depending on the coordinate systems following a sum of poles in L with the sum over L modes as shown below for the case of a Laguerre-Gaussian mode, which it can similarly be applied to other special functions that are solutions to the paraxial Helmholtz wave equation:

$$E(t) = \Sigma LG_L \tag{5}$$

OAM beams can also be polarized for example a LG beam can carry various types of polarization such as linear, circular, radial and azimuthal. Radial and azimuthal (or CVVB) polarized LG beams have both types of chirality in polarization (SAM) and wavefront (OAM) coupled in a single photon (±L) as non-separable parts. These beams are known as Majorana light twisted beams. The combination of polarization and spatial phase modes leads to special class of locally entangled photons, which has a longitudinal field at its focus and can generate smaller spot size upon focusing by a high NA objective lens. These beams are Hermitian where the electric field are E=E*(ψ=ψ*). Below we introduce the Majorana-beam equations (Eq. 6, 7):
Polarized Vector LG Modes (Majorana-Beams):
  Radially polarized (RP) LG mode:

$$|\psi_{RP_{LG}}\rangle = E_{LG}\ell(r, \phi, z) = LG_p^\ell(r, \phi, z)\binom{1}{-i} + LG_p^{-\ell}(r, \phi, z)\binom{1}{i}, \tag{6}$$

Azimuthally polarized (AP) LG mode:

$$|\psi_{AP_{LG}}\rangle = E_{LG}\ell(r, \phi, z) = LG_p^\ell(r, \phi, z)\binom{1}{-i} - LG_p^{-\ell}(r, \phi, z)\binom{1}{i}, \tag{7}$$

Simplifying Equation 6 and 7 in terms of the azimuthal component for the case of ρ=0, normalizing it and replacing the Jones vector for circular polarization we obtain the Majorana-beam equations below (Eq. 8,9):

$$|\psi_{RP_{LG}}\rangle = \frac{1}{\sqrt{2}}\left[e^{i\ell\phi}|RH\rangle + e^{-i\ell\phi}|LH\rangle\right] = |\psi_{RP_{LG}}\rangle^* \leftrightarrow \psi = \psi^*, \tag{8}$$

$$|\psi_{AP_{LG}}\rangle = \frac{i}{\sqrt{2}}\left[e^{i\ell\phi}|RH\rangle - e^{-i\ell\phi}|LH\rangle\right] = |\psi_{AP_{LG}}\rangle^* \leftrightarrow \psi = \psi^*. \tag{9}$$

Eq. 6 through 9 represent radial and azimuthal polarized LG beams, respectively, in terms of the phase and polarization dependence. These beams are the most conspicuous CVVBs since they follow the key Majorana Photon characteristic (E=E*). These are Majorana of coupled SAM and OAM for J=0. When taking the complex conjugate of Eq. 8 and 9, it results back to itself (anti-photon) because both CVVBs are in a superposition of both SAM (Right Hand (RH), Left Hand (LH)) and +OAM (±L) or in a spin-orbit entangled state. Both of these types of vector LG beams are Majorana-like bosons among another higher-order vector beam.

On the other hand, when taking the complex conjugate of a circular polarized LG beam, which is made of a single state (either LH or RH) carrying either ±ℓ, , does not equate to itself. Hence, these are denominated as non-Majorana as shown below in Eq. 10 and 11.
Polarized Scalar LG Modes (Non-Majorana Beams):
  Right-handed circularly polarized LG mode:

$$|RCP_{LG}\rangle = E_{LG}\ell(r, \phi, z) = LG_p^\ell(r, \phi, z)\binom{1}{-i} \text{ and } LG_p^{-\ell}(r, \phi, z)\binom{1}{-i}, \tag{10}$$

Left-handed circularly polarized LG mode:

$$|LCP_{LG}\rangle = E_{LG}\ell(r, \phi, z) = LG_p^\ell(r, \phi, z)\binom{1}{i} \text{ and } LG_p^{-\ell}(r, \phi, z)\binom{1}{i}. \tag{11}$$

Simplifying Equation 10 & 11 in terms of the azimuthal component for the case of ρ=0, normalizing it and replacing the Jones vector for circular polarization we obtain the equations below:

$$|RCP_{LG}\rangle = e^{i\ell\phi}|RH\rangle ; e^{-i\ell\phi}|RH\rangle \rightarrow |RCP_{LG}\rangle^* =$$
$$|LCP_{LG}\rangle, \tag{12}$$

$$|LCP_{LG}\rangle = e^{i\ell\phi}|LH\rangle ; e^{-i\ell\phi}|LH\rangle \rightarrow |LCP_{LG}\rangle^* =$$
$$|RCP_{LG}\rangle. \tag{13}$$

Theoretical Transmission model with Multiple Expansions of OAM and brain tissue.

The following presents a mathematical analysis of transmission in a tissue using Beer's Law and the interaction of multipole expansions of light propagating in a multipole expansion of the material.

The Beer-Lambert Law (Beer's law) is given by Equation 14:

$$I = I_o e^{-\mu_T z}, \tag{14}$$

the ballistic equation 14 can be written as follows:

$$\frac{I}{I_o} = e^{-\mu_T z} = T, \tag{15}$$

where $I_o$ is the incident light; I is the transmitted light; $\mu_T$ is the total attenuation coefficient; z is the path length through the sample. The attenuation coefficient can be typically expressed as the sum of the tissue's scattering coefficient ($\mu_S$) and the tissue's absorption coefficient ($\mu_\alpha$) as shown below in Equation 16.

$$\mu_T = \mu_\alpha + \mu_S. \quad (16)$$

In a multiple scattering event, the reduced scattering coefficient ($\mu'_S$) is based on a spatial anisotropy factor g given by $\mu'_S = \mu_S(1-g)$. The spatial anisotropy factor defines the degree of forward scattering as the mean cosine of the scattering angles ($\cos\theta$). In the incident direction, g takes a value of 1, while for isotropic scattering it takes a value of 0. When the photon scattering comes from a tissue, g is usually between 0.8 and 1. Another important parameter is the transport mean free path $l_{tr}$, which is the distance to randomize the photon's direction in the sample after numerous scattering events defined by $\mu'_S = \mu_S(1-g) = (l_{tr})^{-1}$.

Expanding Equation 16 would give the following:

$$I = I_o e^{-\mu_T Z} \sim I_o(1-\mu_T Z), \quad (17)$$

where $\mu_T Z \ll 1$, $$I \approx I_o(1-\mu_T Z) \rightarrow I - I_o = -I_o \mu_T Z. \quad (18)$$

One expands equation 18 in terms of convolution of $\mu_T$ with the multipole L' and $I_o$ with respect to the light multiple expansion in terms of OAM(L):

$$\Delta I = I_o - I = (\mu_T \otimes I_o)z, \quad (19)$$

the change of intensity in terms of the convolution (Eq. 19) of the absorption coefficient and the intensity at each L value (OAM) is represented by equation 20:

$$\Delta I = (\mu_T \otimes I_L)z, \quad (20)$$

the change in intensity can be written as:

$$\Delta I = \int \mu_T(z) I_L(z) dz. \quad (21)$$

Following Jackson and Griffiths on multipoles with Legendre polynomial multiple expansion for I and μ we obtain the following:

$$I_o = \Sigma_L I_L P_L(z), \quad (22)$$

and, $$\mu_T = \Sigma_L \mu_L P_L(z), \quad (23)$$

change of intensity using equation 20 can be written in terms of the multipole of the laser light (L) and the multipole of the material attenuation (L'):

$$\Delta I = I - I_o = \int (\Sigma_L I_L P_L(z))(\Sigma_L \mu_L P_L(z)) dz, \quad (24)$$

for the following inputs: L=0,1,2,3 which couples with L' of material using orthogonality ∫(L-L') gives maximum coupling of poles for material and light OAM poles. The following shows the multipole moment of $I_L$ and $\mu_L$, in terms of the OAM light (L) and the material (L').

TABLE 3

Relation of the multipoles of OAM light and the material

| OAM light | Material |
|---|---|
| L = 0 | $P_0$ Monopole |
| L = 1 | $P_1$ Dipole |
| L = 2 | $P_2$ Quadrupole |
| L = 3 | $P_3$ Octopule |

FIG. 6 shows graphically the relation between the OAM (L) and the multipoles, which shows the topology matching of the OAM mode and the radiation patterns of the multipoles.

Material and Methods
Experimental Setup

A He—Ne laser of 5 mW at 633 nm (horizontally polarized) was used as a light source, focusing onto a single-mode optical fiber (SMOF) by the use of mirrors. The output beam from the optical fiber passed through a collimator and illuminated the spatial light modulator (SLM), which was set at reflection mode (L=0). Then, a first lens was used to collimate the first order diffraction through a pinhole. Then, the outcome went through a chopper to modulate the signal at ~1 kHz. A second lens was then used to re-collimate the beam, which then went through various wave-plates (half-wave plate, quarter-wave plates and vortex retarders) to generate four states of polarization at different OAM values. The generated optical vortex beams propagated the cerebellum tissue. The sample was held on a motorized scanner, which was connected to the computer to read out the transmission signal. Finally, the beam went through a 4f imaging system constituting of two lenses and it was followed by a detector that was connected to a lock-in amplifier, which picked up the final signal and displayed it in the computer program (see FIG. 7).

Sample Material Preparation

The cerebellum samples were prepared following procedures approved by the Institutional Animal Care and Use Committee (IACUC). Tissue samples were obtained from 21-day old rats of either sex that were exposed to control or hypoxic conditions. Animals were placed inside a 13.0"× 5.5"×6.0" induction chamber connected to a tank containing pressurized air (control) or hypoxic gas (7% oxygen, 93% nitrogen). Gas for each condition was delivered at 2 litres per minute for 12 minutes. At the end of gas exposure, the rats received an overdose of pentobarbital and were perfused with 0.1 M phosphate buffer (PB) followed with 4% formaldehyde dissolved in 0.1 M PB. The rat brains were post-fixed in 4% formaldehyde solution overnight and stored in 0.1 M PB until used for optical measurements. Fixed cerebelli from normoxic and hypoxic groups were processed with coronal section by using a compresstome at about 600 μm±1 μm, which is the path length defined by z. The absorption coefficient is about 0.25 cm−1 and the scattering coefficient is about 16 cm−1 in mouse brain tissue6. The oxygen (02), which is captured by the iron (Fe) inside the heme protein pocket, will have an important effect in the underlining dynamic biological processes such as in propagation and absorption.

Results

Data was collected for a 600-μm thick cerebellum tissue sample. The LG beams (Majorana and non-Majorana) at various L-values (0-3) and polarization were transmitted through the sample in a scanned area of 2.75 mm2 (FIG. 8(A)). A total of 144 points at different x-axis and y-axis were collected and analyzed. The highest peaks of intensity are shown in regions where the beam was out of the sample. For further analysis, the brain region was divided in four different regions (R1, R2, R3, and R4) as shown in FIG. 8(B). For these regions a calculated average was obtained and later plotted in a linear plot as Transmission versus OAM values (T vs. L).

The polarizations and OAM (L) values tested are linear polarization (horizontal & vertical input for L=0), radial & azimuthal polarization (vector beams (L=1) & higher order vector beams (L=2 & L=3)) and left and right-handed circular polarization (L=0 through L=3).

The following displays the results obtained when probing the Cerebellum-Control sample. A surface 3D plot was used to represent the transmission at different x and y-axis, which was plotted for different polarization states at various OAM (L) values. A 2D plot was also used to represent Transmission versus the OAM (L) to observe if there is a dependency on OAM as its value increases or a dependency of polarization state.

Cerebellum Control

From FIGS. 9 and 10, we observe that there is some dependency of transmission based on the L-value tested. For these figures, we see that L=0 has the lowest transmission followed by L=1, L=2, and L=3 have an overlapping transmission. In terms of polarization, we observe that the higher transmission percentage is obtained from right circular polarization, where: HOVB=Higher order vector beam; H-input=Horizontal input polarization; V-input=Vertical input polarization; LCP=left circular polarization; RCP=right circular polarization.

Table 4 shows the summarized results from FIGS. 9 & 10. The polarization with higher transmission is in bold.

TABLE 4

Transmission percentage representation for 21% Oxygen for each polarization state at various L values.

| L-Value | Majorana (Horizontal-input pol.) | Majorana (Vertical-input pol.) | Left Circular Pol. (LCP) | Right Circular Pol. (RCP) |
|---|---|---|---|---|
| 0 | 2.5% Horizontal Pol. | 2.8% Vertical Pol. | 2.76% | 2.85% |
| 1 | 3.5% Radial Pol. | 3.6% Azimuthal Pol. | 3.65% | 3.8% |
| 2 | 5.2% HOVB | 5.9% HOVB | 4.7% | 6.65% |
| 3 | 5.1% HOVB | 5.5% HOVB | 5% | 6.61% |

According to the table above, the transmission based of each polarization takes the following order:

For L=0: RCP; Majorana (Vertical Pol.); LCP; Majorana (Horizontal Pol.).

For L=1: RCP; LCP; Majorana (Azimuthal Pol.); Majorana (Radial Pol.).

For L=2: RCP; Majorana (HOVB, V-input); Majorana (HOVB, H-input); LCP.

For L=3: RCP; Majorana (HOVB, V-input); Majorana (HOVB, H-input); LCP.

The data taken is further analyzed by taking the average of four different regions. The average result is used to plot the transmission at various OAM values (T vs. L). The average of four different regions is used to plot transmission versus the OAM (T vs. L) for various polarizations as shown in FIGS. 11 & 12. There is increase in transmission of the cerebellum tissue with respect to L=0 to L=3. This indicates that the studied tissue has more poles than monopole (Gaussian L=0) have struts being more dipole, quadrupole and octupole nature due brain chirality, which helps to propagate deeper into tissue, In general, higher values of OAM can be used to store more information as in bits, which is an important application in optical communication not just propagation in tissues; this is due to their special topology structure. Additionally, the structure of the tissue will depend on L-different types of tissue provide different type of topology layout for example chicken vs. human tissue could be different.

Regions 1 and 2 (FIG. 11) show a stronger dependence on L, followed by Region 4. Region 3 (FIG. 12) shows the least dependent for L=0,1 after L=1, the transmission increases linearly. In these figures, it is also observed that RCP has higher transmission such in Regions 4,1 and 2; this is congruent with results of the 3D plots.

DISCUSSION & CONCLUSION

This study of the transmission of polarized OAM beams at different L values for control (21%) cerebellum tissue can contribute to the importance of the oxygen level studies in the brain. How do the results from this study compare to previous analyses of the effects of environmental hypoxia in brain tissue? Previous work in adult rodents has focused on the metabolic effects of hypoxia by use of flavine adenine dinucleotide (FAD) fluorescence imaging as a proxy of oxygen consumption in mitochondria. FAD is an intrinsically fluorescent coenzyme that is oxidized during oxidative phosphorylation and reduced to $FADH_2$ by the tricarboxylic acid cycle. One would expect that if there were a decreased rate of oxidative metabolism in the hypoxic condition, then $FADH_2$ would be available in larger amounts than FAD in hypoxic tissues compared to controls. However, it is important to note that neonate animals used in this study show evidence of higher levels of enzymes used for non-oxidative metabolism compared to adult tissues. Therefore, future studies could measure FAD fluorescence between control and hypoxic brain samples in neonate versus adult animals and examine their relationship to the changes in transmission observed in this study.

Additionally, this study shows preliminary results of the interaction of different light states (OAM and polarization) with a control oxygen cerebellum tissue of 21%. Results demonstrated that the topology of both the light and the materials are important for optical interactions in transmission in matching the multipole expansion of both. Our study of optical vortex LG beams (Majorana and non-Majorana) produced the salient outcome that the transmittance of this chiral beam through the cerebellum tissue displays strong positive dependency on OAM L for circular (left and right), and vector beams (radial and azimuthal) LG beams as observed in the control cerebellum sample. A control cerebellum tissue seems more uniform. Hence, the transmission is more constant. In this case, right circularly polarized beam (RCP) gave the highest transmission followed by a Majorana beam (Horizontal-input polarization). Also, it was possible to observe a stronger L dependence for Transmission as observed in the 3D & 2D plots. Moreover, since the transmission of the control cerebellum sample has L dependence, we can conclude that the media's octupole is greater than its quadrupole and its dipole is greater than its monopole.

The studied light electric has a vortex structure, which can have multiple poles of OAM, which travel in a material that has topological structure in its electronic and vibration states. These act like a maze for the light multipoles to match and propagate like Eigen vectors with appropriate Eigen values to maximize the outcome of the optical process such as in absorption, transmission and emission from electric states. These multipoles can be involved with the matching up with the symmetry of the moments involved with vibrational states in the Raman processes.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Examples in the present disclosure may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method of obtaining polarized orbital angular momentum using structure vortex vector light such as Laguerre Gaussian beams with linear, circular, radial, and azimuthal polarization for Raman spectra detection, the method comprising the steps of:
    emitting a polarized vector vortex laser light from a laser source;
    passing the polarized vector vortex laser light through a narrow band filter to produce filtered light at the excitation wavelength; passing the filtered light through a wave plates (quarter wave plates, half-wave plates) to generate polarized light;
    passing the polarized light through a q-plate with a q of ½ or 1 (or through vortex retarders or spiral plates) to generate a various polarized structure vortex vector light;
    directing the polarized vector vortex light to contact a sample, thereby producing a Raman signal; and collecting the Raman signal back into a spectrometer, thereby obtaining a Raman spectrum of the sample.

2. A method to study transmission in tissues for imaging applications using the Multiple Expansions of OAM, the method comprising the steps of: emitting a polarized laser light from a laser source; focusing the polarized laser light on a single-mode optical fiber (SMOF) to produce a focused beam; passing the focused beam through a collimator and to a spatial light modulator (SLM); collimating first order diffraction from the SLM through a pinhole and then into a chopper that modulates at a first frequency to produce modulated light; collimating the modulated light to produce collimated, modulated light; generating four states of polarization at different orbital angular momentum (OAM) values from the collimated, modulated light to produce OAM-polarized light: transmitting the OAM-polarized light through a tissue sample to produce transmitted light; collimating the transmitted light to produce collimated, transmitted light: detecting the collimated, transmitted light with a detector thereby producing detected light; and producing data plots in 2D or 3D with the detected light.

3. A method as defined in claim 1, wherein Raman applications are used for an OAM structured light microscope using multipoles of OAM light coupled with the multipoles of material.

4. A method as defined in claim 1, wherein absorption and transmission applications using light emitting diodes, tunable lasers, solid-state lasers for an OAM structured light microscope uses multipoles of OAM light coupled with the multipoles of material.

5. A method as defined in claim 1, wherein different wavelengths of light such as 452 nm, 785 nm, 1060 nm and key optical windows wavelengths (800 nm, 1200 nm, 1800 nm, 2200 nm) are used for resonance and non-resonance Raman scattering for pumping the samples.

6. A method as defined in claim 1, wherein picosecond and femtosecond lasers are used for absorption and transmission using multiphoton and for harmonic generation.

* * * * *